(12) United States Patent
Afrianto et al.

(10) Patent No.: US 10,253,691 B2
(45) Date of Patent: Apr. 9, 2019

(54) APPARATUS FOR PROTECTING AIRCRAFT COMPONENTS AGAINST FOREIGN OBJECT DAMAGE

(71) Applicant: C SERIES AIRCRAFT LIMITED PARTNERSHIP, Mirabel (CA)

(72) Inventors: Sigit Afrianto, Pierrefonds (CA); Jean Brousseau, Pierrefonds (CA)

(73) Assignee: C SERIES AIRCRAFT LIMITED PARTNERSHIP, Mirabel (CA)

( * ) Notice: Subject to any disclaimer, the term of this patent is extended or adjusted under 35 U.S.C. 154(b) by 525 days.

(21) Appl. No.: 14/773,578

(22) PCT Filed: Feb. 25, 2014

(86) PCT No.: PCT/IB2014/000204
§ 371 (c)(1),
(2) Date: Sep. 8, 2015

(87) PCT Pub. No.: WO2014/135942
PCT Pub. Date: Sep. 12, 2014

(65) Prior Publication Data
US 2016/0017804 A1   Jan. 21, 2016

Related U.S. Application Data

(60) Provisional application No. 61/773,235, filed on Mar. 6, 2013.

(51) Int. Cl.
*F02C 7/055* (2006.01)
*F02C 6/08* (2006.01)
(Continued)

(52) U.S. Cl.
CPC ............... *F02C 7/055* (2013.01); *F02C 6/08* (2013.01); *F02C 7/18* (2013.01); *F02C 9/18* (2013.01);
(Continued)

(58) Field of Classification Search
CPC .............................................. F02C 7/05–7/055
See application file for complete search history.

(56) References Cited

U.S. PATENT DOCUMENTS 2,553,512 A    5/1951  Cotton
3,426,981 A    2/1967  Allcock
(Continued)

FOREIGN PATENT DOCUMENTS

CN    101087639 A    12/2007
WO       9848160 A1   10/1998
WO    2012125895 A1    9/2012

OTHER PUBLICATIONS

Second Chinese Office Action for corresponding application 201480011833.6; dated Dec. 16, 2016.
(Continued)

*Primary Examiner* — Arun Goyal
(74) *Attorney, Agent, or Firm* — Nixon & Vanderhye P.C.

(57) ABSTRACT

A device for protecting aircraft equipment against contact by a foreign object including an interference arrangement disposed in an air inlet upstream from the aircraft equipment where the interference arrangement is configured to physically obstruct passage of the foreign object within the air inlet.

10 Claims, 11 Drawing Sheets

(51) Int. Cl.
*F02C 7/18* (2006.01)
*F02C 9/18* (2006.01)

(52) U.S. Cl.
CPC ......... *F05D 2220/32* (2013.01); *Y02T 50/675* (2013.01)

(56) References Cited

U.S. PATENT DOCUMENTS

| | | | |
|---|---|---|---|
| 4,833,879 A | 5/1989 | Verduyn | |
| 5,269,134 A | 12/1993 | Vermejan | |
| 6,923,911 B1 | 8/2005 | Beier | |
| 7,857,257 B2 | 12/2010 | Schwarz | |
| 8,204,671 B2 * | 6/2012 | Agrawal | F02C 9/00 701/100 |
| 8,869,537 B2 * | 10/2014 | Geis | F01D 17/02 55/306 |
| 9,624,831 B2 * | 4/2017 | Brousseau | F02C 7/00 |
| 2007/0245738 A1 | 10/2007 | Stretton | |
| 2008/0053101 A1 | 3/2008 | Schwarz | |

OTHER PUBLICATIONS

Chinese Office Action for corresponding application 201480011833.6; Report dated Apr. 20, 2016.
International Search Report for corresponding application PCT/IB2014/000204 filed Feb. 25, 2014; dated Jul. 7, 2014.
Written Opinion for corresponding application PCT/IB2014/000204 filed Feb. 25, 2014; dated Jul. 7, 2014.

* cited by examiner

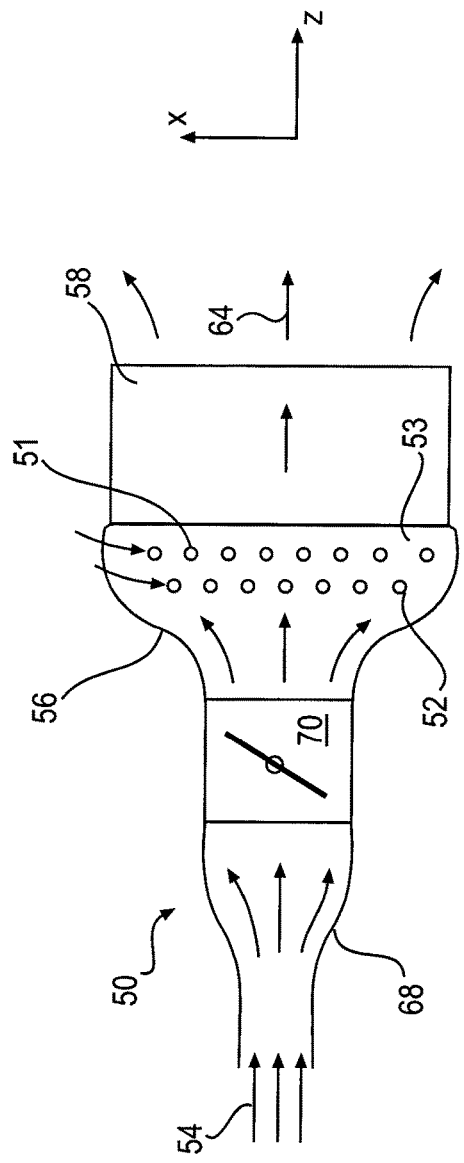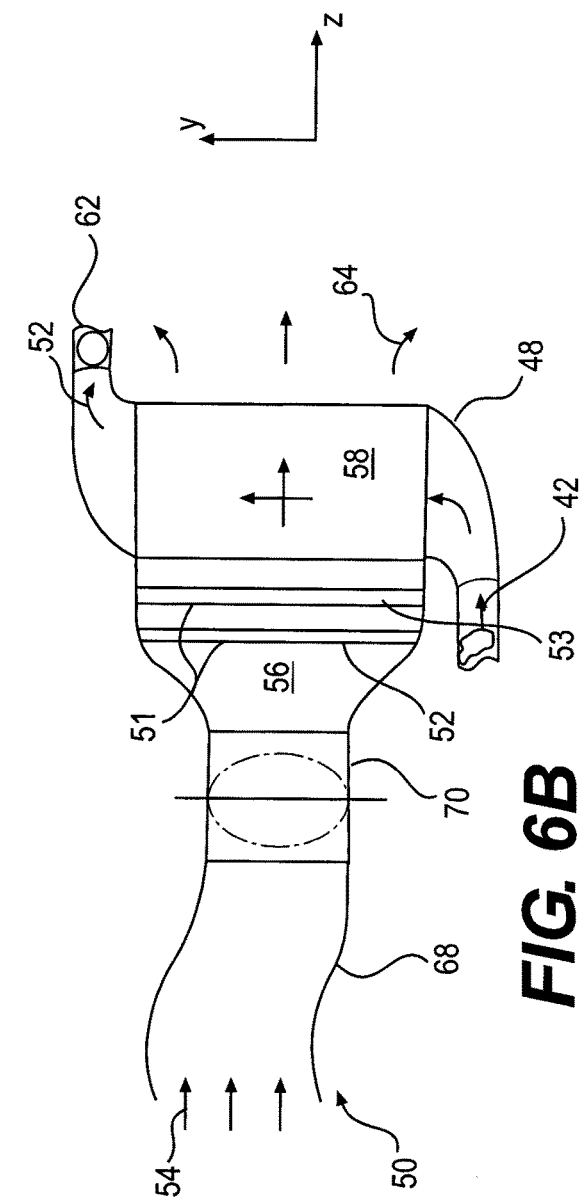
FIG. 6A
FIG. 6B

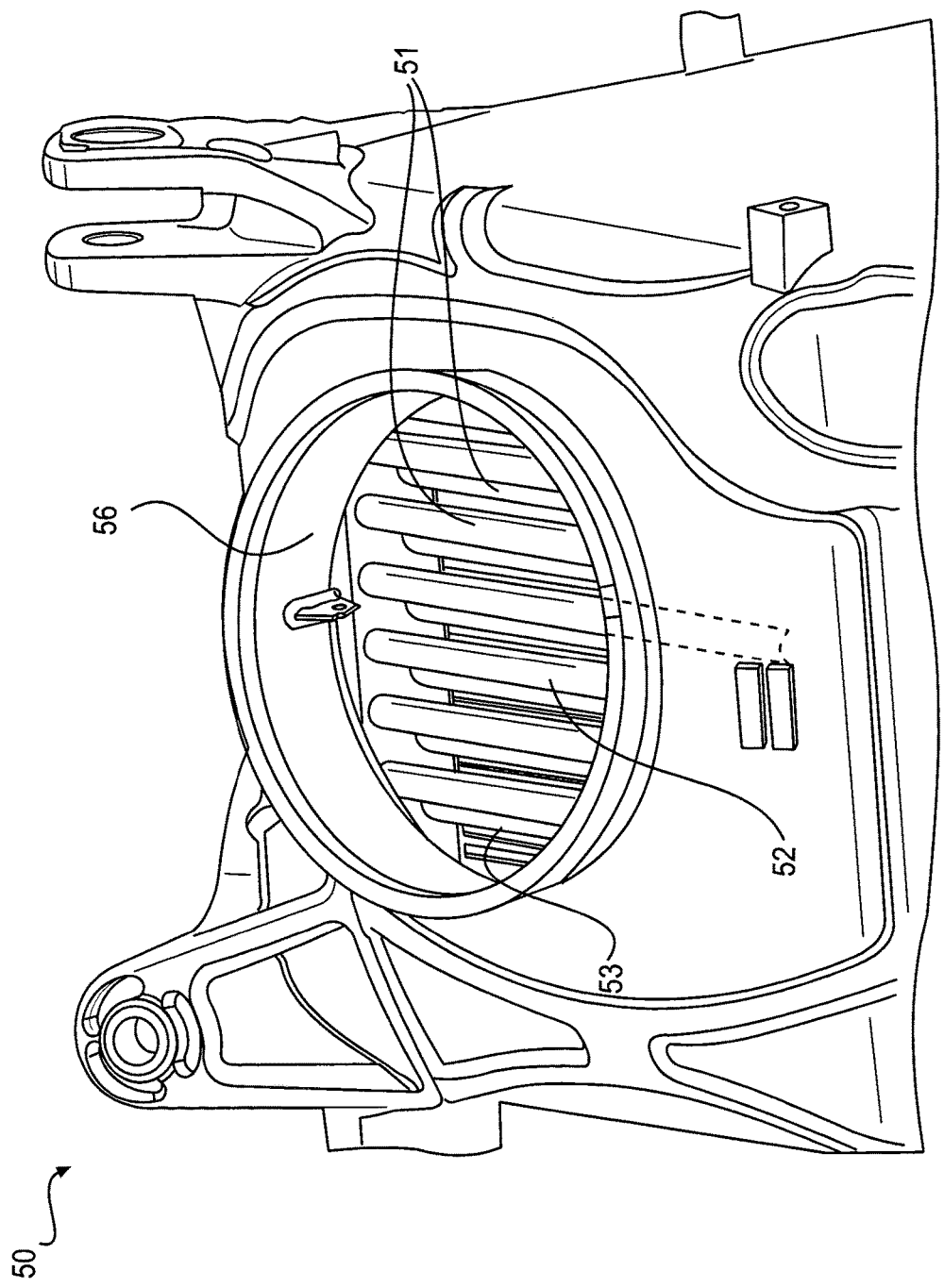

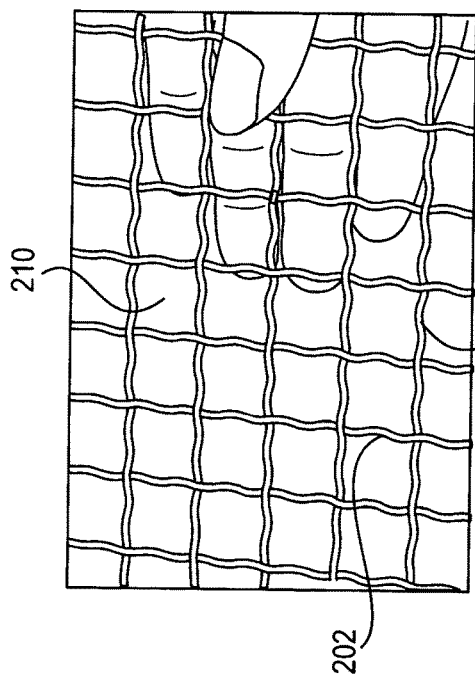
FIG. 12
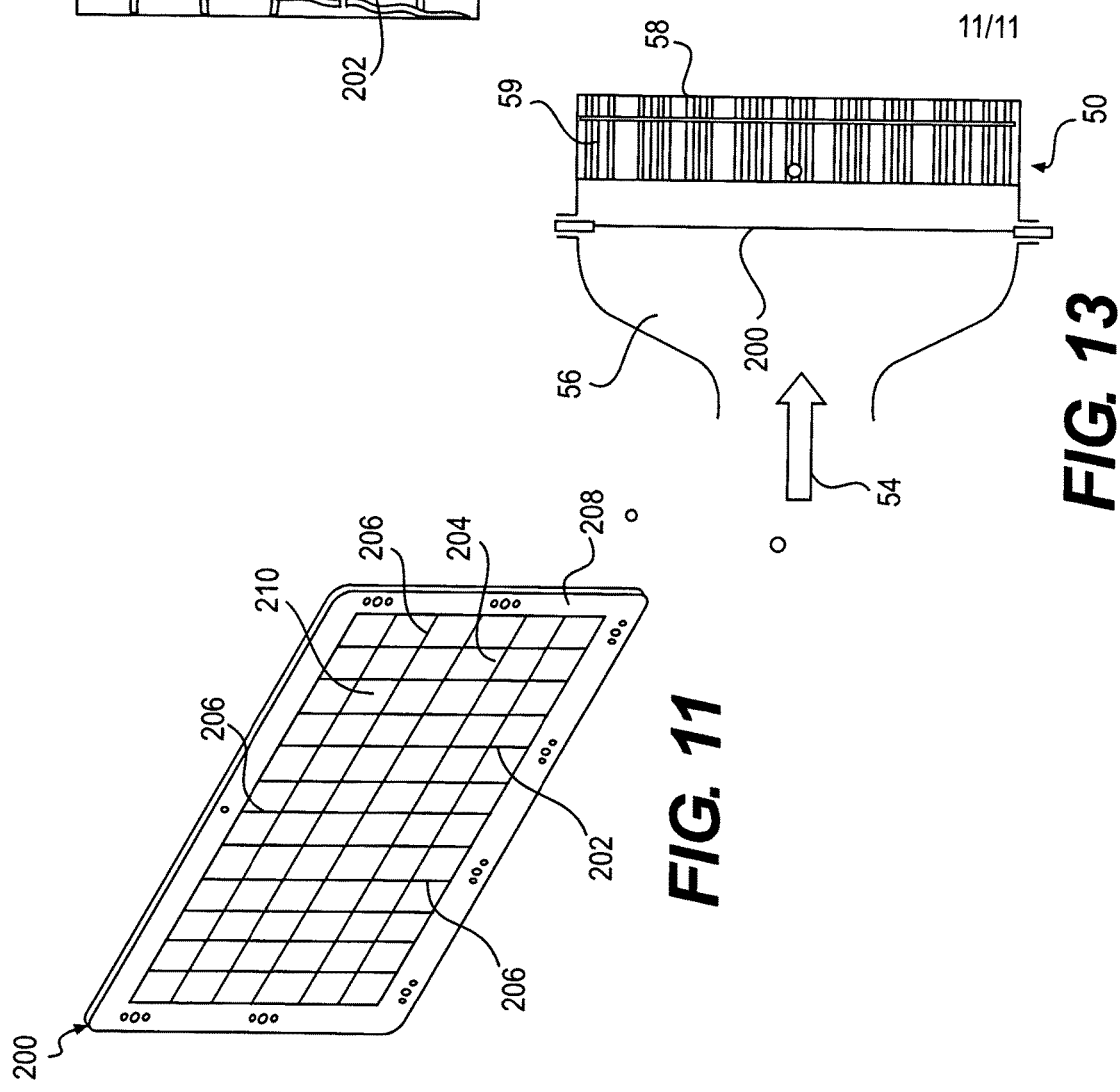
FIG. 13
FIG. 11

APPARATUS FOR PROTECTING AIRCRAFT COMPONENTS AGAINST FOREIGN OBJECT DAMAGE

CROSS REFERENCE TO RELATED APPLICATION AND CLAIM OF PRIORITY

The present application claims priority to U.S. provisional patent application No. 61/773,235 filed on Mar. 6, 2013, the entire contents of which are hereby incorporated by reference.

TECHNICAL FIELD

The invention relates to systems for protecting aircraft and aircraft components against damage from foreign object impact. More particularly, the invention concerns an apparatus arrangement for protecting a precooler of a geared turbofan engine from foreign object impact damage.

RELATED ART

It is known to bleed hot, compressed air generated by an aircraft engine and to provide that compressed air to equipment on the aircraft to perform certain onboard functions. Specifically, it is known to siphon hot, compressed air (also referred to as "bleed air") from an aircraft engine so that the hot air may be used for aircraft functions outside of the aircraft engine. For example, the bleed air may be used in an aircraft's heating, ventilation, and air conditioning ("HVAC") system, the aircraft's anti-icing system, and the aircraft's fuel tank inerting system.

For an HVAC system installed in an aircraft with two engines, bleed air typically is siphoned from each engine and is sent to respective left and right side HVAC packs. The bleed air may be mixed with recirculated air in the cockpit and passenger cabin, where the bleed air conditions (i.e., heats) the cabin temperature and pressurizes the aircraft's interior.

For the wing anti-icing system, the hot bleed air may be used to heat areas of the aircraft which are prone to ice accumulation, such as along a wing's leading edge.

With respect to the aircraft's fuel tank inerting system, the bleed air may be used to reduce the oxygen content within the aircraft's fuel tank(s), thereby minimizing the possibility of fuel ignition within the fuel tank(s).

Depending upon the location where the bleed air is removed from an engine, the bleed air may exit the engine at temperatures up to 450° C. or more. Specifically, bleed air taken from a location near to the low pressure turbine may be at a temperature of about 120° C. Bleed air from a location near to the high pressure turbine may be at a temperature of about 500° C. Since the temperature of the bleed air may be too hot to directly circulate within the various systems of the aircraft, the hot bleed air may have to be cooled prior to use with one or more of the aircraft's other systems. As a result, it is known to provide a cooling device, commonly referred to as a precooler, to cool the hot bleed air down to temperature between about 200° C. to 232° C. depending on the usage. For engines such as turbofan engines, which use a turbine driven fan to provide thrust, a precooler is typically housed proximate to each engine, such as within the engine's nacelle or above the engine's pylon.

A precooler typically utilizes outside (or ambient) that is air drawn into by the fan to cool the hot, bleed air. Once inside the nacelle, the ambient air may be between 70° C., at low altitude on a hot day, and −60° C., at high altitude on a cold day. The precooler typically includes a cross flow air-to-air heat exchanger, which transfers heat energy from the streams of the hot, bleed air to the stream of cold, ambient air, while the two streams remain separated from one another. As should be apparent to those skilled in the art, a stream of cooled, bleed air exits from the precooler for use within the aircraft. Consequently, a stream of heated, ambient air also exits from the precooler and is discharged into or around the engine nacelle or outside the aircraft, for example, above the pylon installation.

Typically, precoolers collect the outside ambient air through an air inlet that is positioned in a manner so as to not directly face the incoming ambient airflow. For example, the precooler air inlet may be disposed within the nacelle behind the fan and oriented such that its opening faces a direction perpendicular to the direction of the ambient airflow. In other arrangements, the precooler air inlet may extend through the nacelle or through the pylon and include an opening so as to expose the inlet to the ambient air outside the aircraft. This opening does not directly face the incoming ambient airflow but is instead positioned at an angle, typically perpendicular, relative to the airflow.

In these conventional arrangements, it is unlikely that a foreign object would enter the precooler air inlet due to the orientation of the air inlet relative to the direction of ambient airflow. Therefore, traditionally, precooler foreign object exposure has not been a significant concern.

However, as aircraft requirements and demands change, the positioning of the precooler air inlet has been altered thus warranting consideration of foreign object intrusion. For example, geared turbofan (GTF) engines typically have a lower fan air pressure than non-GTF engines. To compensate for this lower pressure, a fan air inlet with a ninety-nine percent recover is required. As a result, the precooler of the GTF engine is fitted with a forward facing air inlet scoop disposed directly downstream from the fan. This scoop is vulnerable to hail and other foreign objects which are carried in the ambient airflow which passes through the fan into the nacelle. Such objects are typically travelling a high speed and could impact and damage the scoop, the precooler, or the heat exchanger contained therein. Such foreign object impact could effect the performance of these components in flight and may require costly delays on the ground for inspecting and repairing the precooler arrangement.

Accordingly, there is a need for a device for protecting exposed precooler arrangements, and other exposed aircraft arrangements and components, from foreign object contact and damage.

BRIEF SUMMARY

The disclosure concerns a device for protecting aircraft equipment against contact by a foreign object including an interference arrangement disposed in an air inlet upstream from the aircraft equipment where the interference arrangement is configured to physically obstruct passage of the foreign object within the air inlet.

The disclosure further provides a precooler for a geared turbofan aircraft engine including a heat exchanger, an air inlet scoop disposed upstream from and in fluid communication with the heat exchanger, the scoop facing a direction of travel of the aircraft so as to directly receive ambient airflow entering the engine from outside of the aircraft, and an interference arrangement disposed upstream from the heat exchanger and configured to physically obstruct passage of a foreign object within the precooler.

The invention also provides a geared turbofan aircraft engine assembly, including a nacelle, an engine disposed within an annular cavity of the nacelle and supported by a pylon, a precooler configured to receive and condition hot bleed air from the engine and ambient air entering the nacelle from an exterior of the aircraft, where the precooler comprises a forward facing scoop configured to receive the ambient air, and where the precooler further comprises an interference arrangement configured to physically obstruct passage of a foreign object travelling in the ambient air within the precooler.

The above described and other features are exemplified by the following detailed description.

BRIEF DESCRIPTION OF THE FIGURES

FIGS. 6A and 6B are top and side schematic cross-sectional views, respectively, of the precooler of FIG. 5 showing a foreign object protection arrangement;

FIGS. 7 and 8 are front perspective views thereof with a scoop of the precooler omitted;

FIG. 11 is a foreign object protection arrangement in another embodiment of the invention;

FIG. 12 is an enlarged partial view thereof; and

FIG. 13 is a cross-sectional schematic view of the foreign object protection arrangement of FIG. 11 disposed in the precooler.

DETAILED DESCRIPTION

Figure 1:
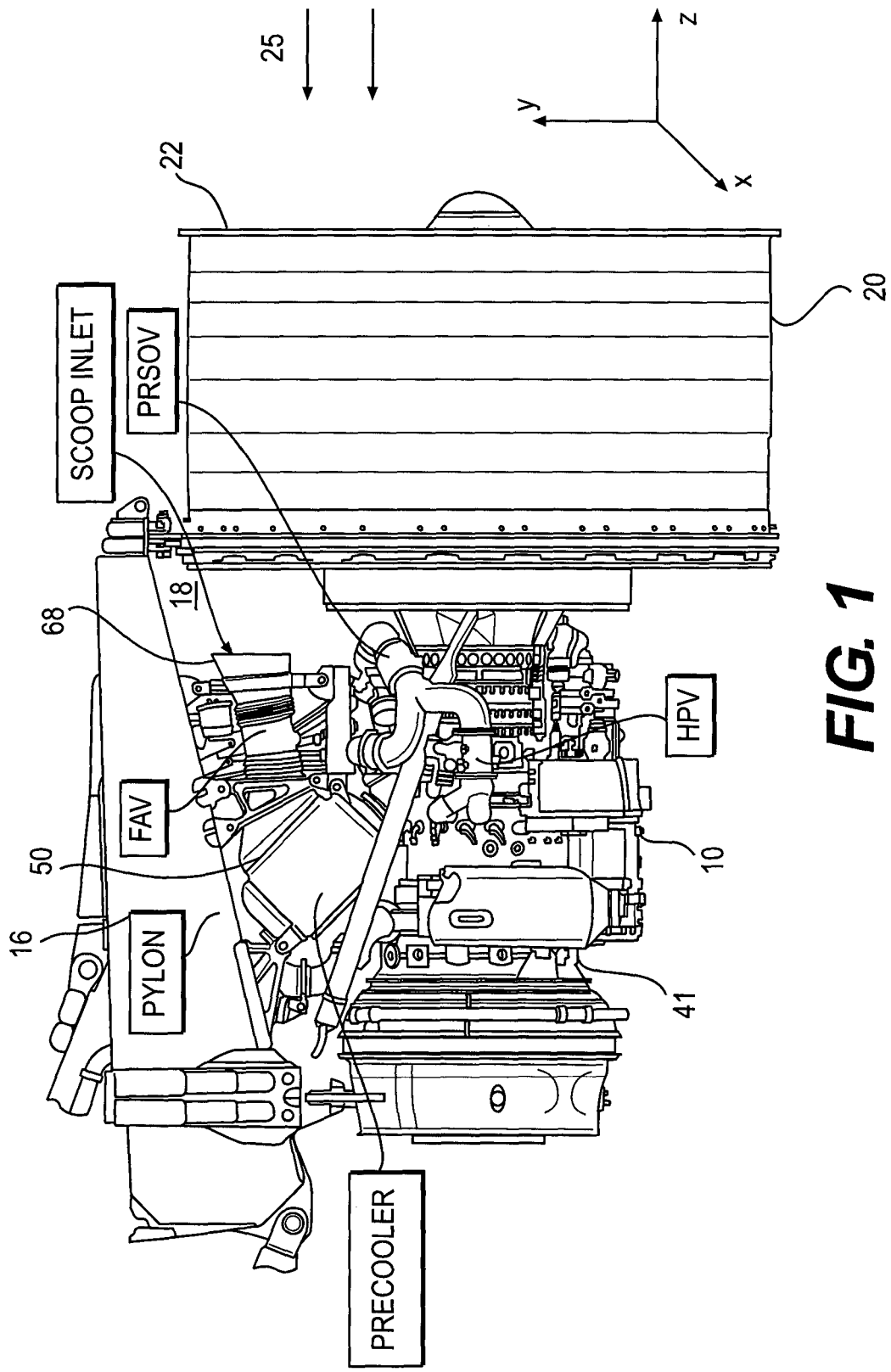
FIG. 1 is side view of an aircraft turbine engine having a foreign object protection arrangement according to an exemplary embodiment of the invention.
Figure 2:
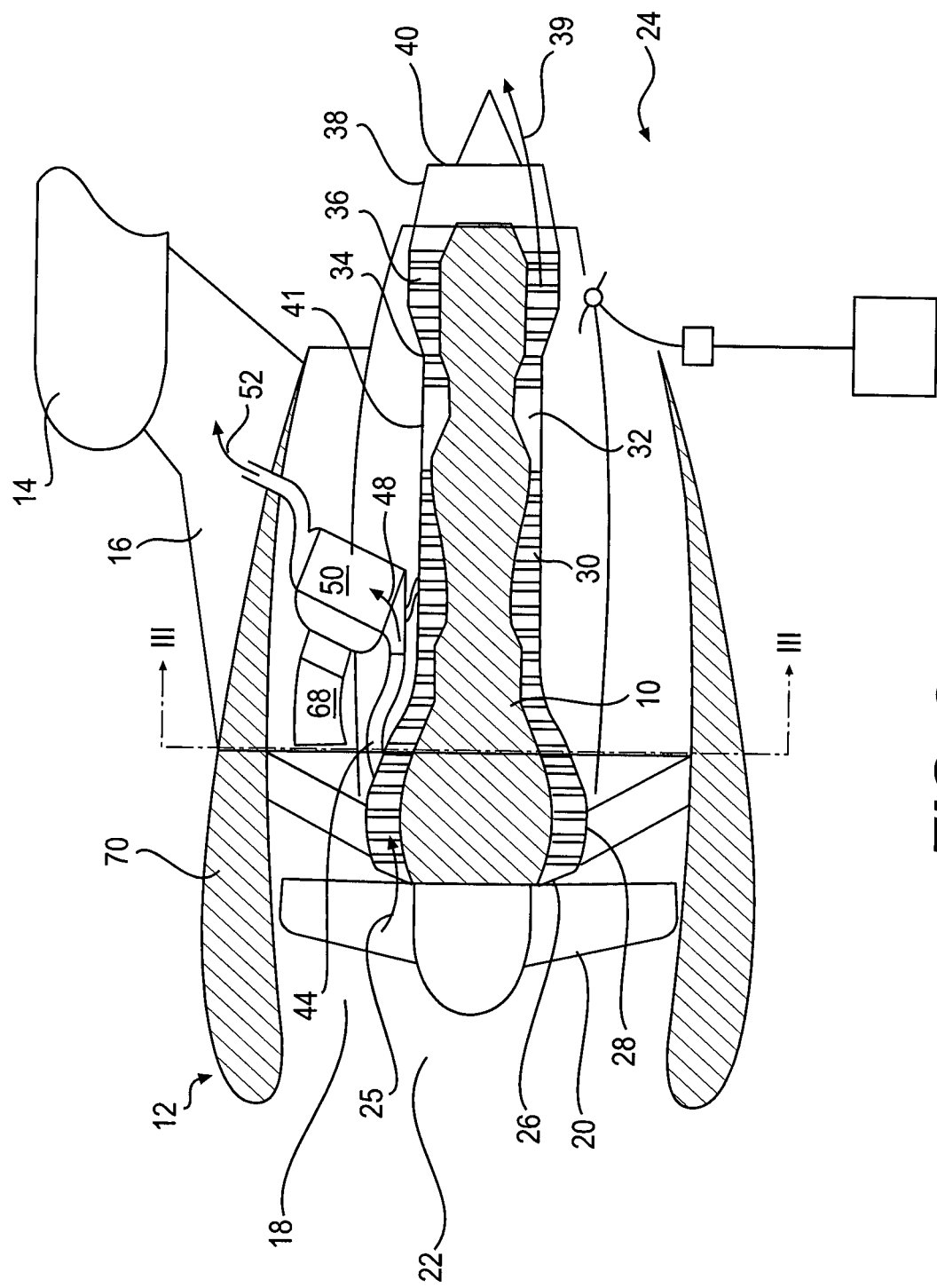
FIG. 2 is a schematic cross-sectional view of the engine of FIG. 1.
Figure 3:
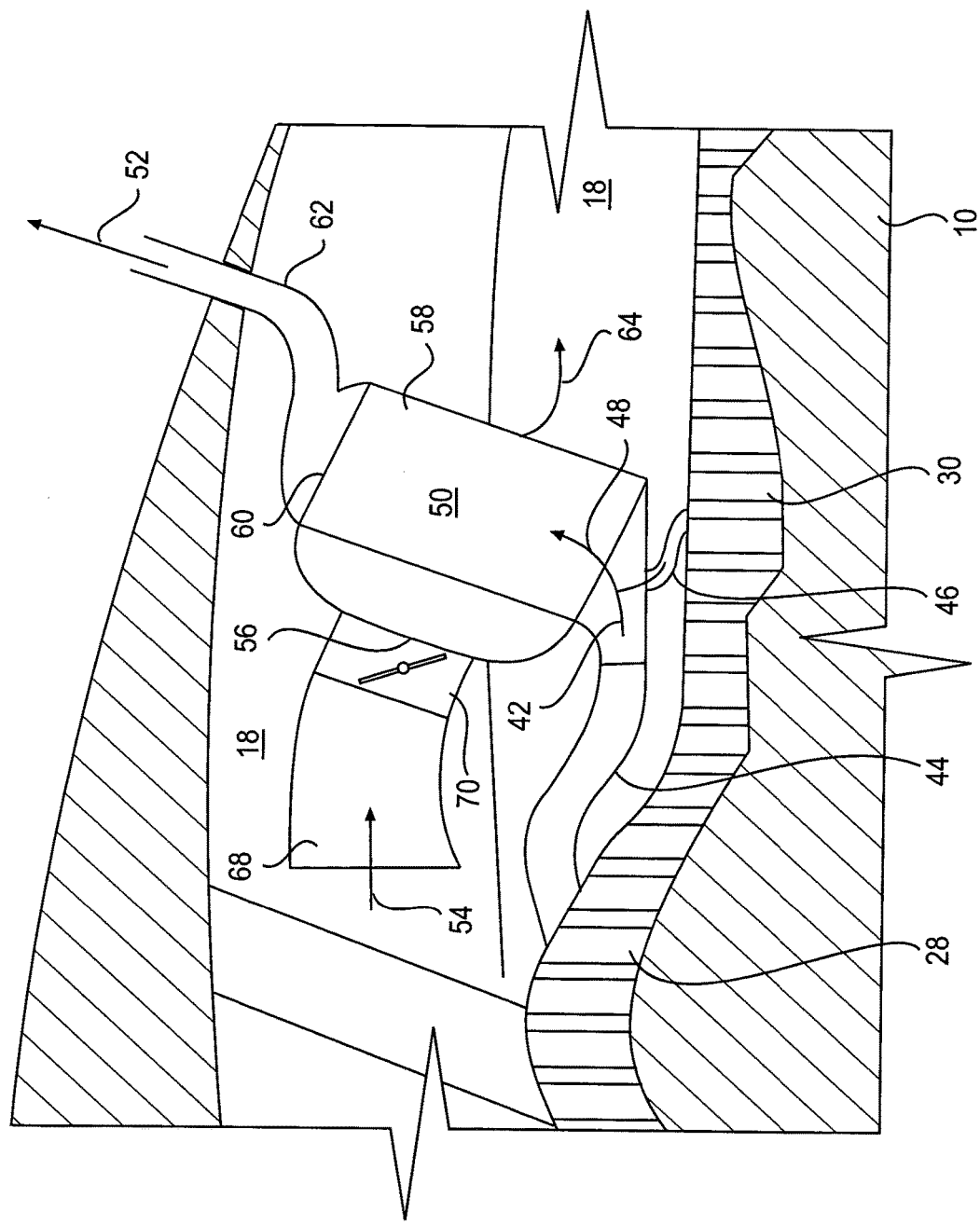
FIG. 3 is an enlarged partial view thereof.
Figure 4:
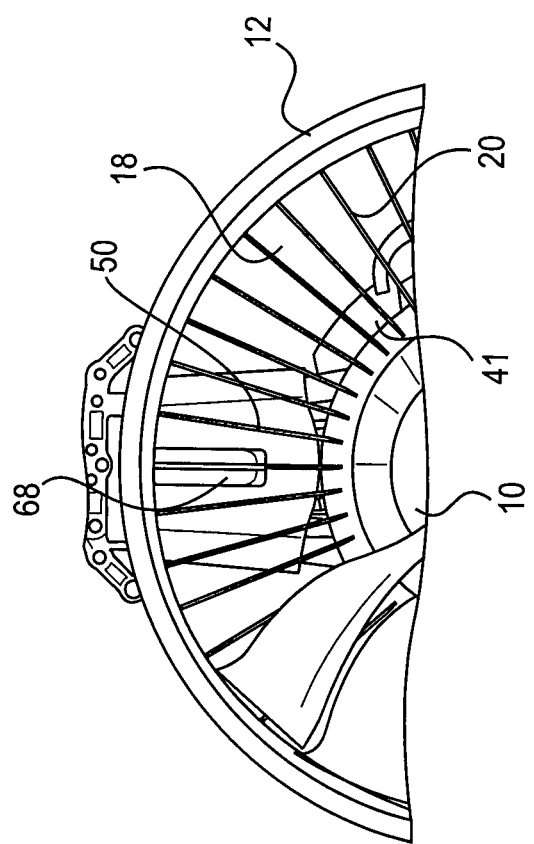
FIG. 4 is partial front view of the engine of FIG. 1.
Figure 5:
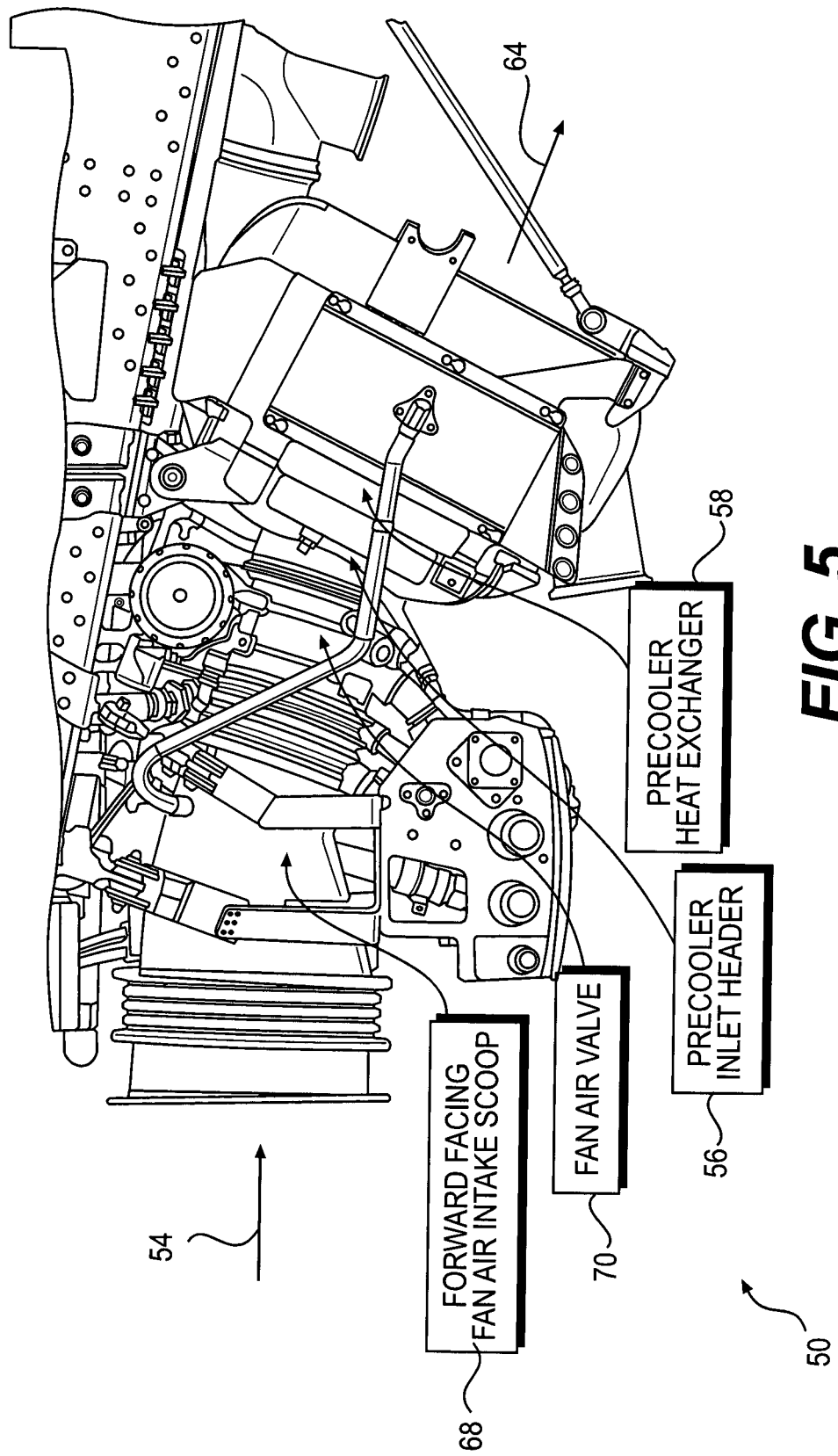
FIG. 5 is a side view of the precooler of the engine of FIG. 1.

FIG. 1-3 show various views of an aircraft engine system in accordance with the invention. Therein, an aircraft turbine engine 10 is depicted as housed within a nacelle 12. The nacelle 12 has a tubular shape and is suspended from a wing 14 by a pylon 16. The nacelle 12 forms an annular cavity 18 around the turbine engine 10 through which air can flow. In use, the turbine engine 10 drives a fan 20 positioned in front of the turbine engine 10, which draws ambient air 25 into the cavity 18 through a front air inlet 22. This fan air or ambient air 25 passes through the nacelle 12 and out of a rear air outlet 24. Some of the ambient air 25 is mixed with fuel and combusted within the turbine engine 10 and some of the ambient air 25 is drawn past the turbine engine 10 to provide thrust. This arrangement is known as a turbofan. In one embodiment, the engine 10 includes a reduction gear mechanism utilized for driving the fan 20. This type of aircraft engine arrangement is known as a geared turbofan (GTF) engine.

The ambient air 25 is drawn into the nacelle 12 from outside of the aircraft and is typically lower in temperature relative to the temperature of air inside the engine. This cold ambient air 25 enters the turbine engine 10 via a turbine inlet 26 and passes through a low pressure compressor 28 followed by a high pressure compressor 30. The ambient air 25 is then mixed with fuel and ignited in a combustion chamber 32. The combustion gasses 39 pass through high and low pressure turbines 34 and 36, causing rotation. The high and low pressure turbines 34, 36 are connected to the fan 20 and/or to the above-referenced GTF gear mechanism and, due to their rotation, drive the fan 20. The combustion gases 39 exit from the high and low pressure turbines 34, 36 and exit through a nozzle 38 and a turbine outlet 40 at a rear of the engine 10.

As illustrated in FIG. 2, the compressors 28 and 30, combustion chamber 32, and turbines 34 and 36 are enclosed by an engine casing 41, which forms the outer wall of the turbine engine 10. The annular cavity 18 extends around the engine casing 41 and is bounded at its outer extent by an inner surface of the nacelle 12.

As can be seen in FIGS. 2-3, a stream of hot, compressed air 42 is bled from the turbine engine 10. This hot bleed air 42, which is preferably drawn from both the low and high pressure compressors 28 and 30 via conduits 44 and 46, respectively, is sent to the hot air inlet 48 of a precooler 50.

The precooler 50 serves to cool the stream of hot bleed air 42, producing a stream of cooled hot bleed air 52 which can be used in other aircraft systems, for example, in the aircraft's HVAC system, in an anti-icing system, or it can be fed to an engine starter valve of an opposite engine, etc.

In use, a stream of cold air 54, taken from the ambient air 25 drawn in by the fan 20, is received at a cold air inlet 56 of the precooler 50. See, particularly, FIG. 3. The streams of cold air 54 and hot bleed air 42 pass through a heat exchanger 58 disposed within the precooler unit 50. The heat exchanger 58 allows heat energy from the stream of hot bleed air 42 to be transferred to the stream of cold air 54, thereby cooling the former and heating the latter. In this way, the hot bleed air 42 is reduced in temperature to a safe and sufficient level before being directed on for further use within the aircraft as the cooled hot bleed air 52.

The heat exchanger 58 may be embodied in a variety of ways. For example, the hot bleed air 42 may be fed through a plurality of tubes or fins made of a conductive material. The cold ambient air 54, as it passes through the precooler 50, flows past the tubes or fins, thereby allowing the heat transfer to occur. In this way, the cold ambient air 54 is heated to produce heated ambient air 64. Similarly, the hot bleed air 42 is cooled to produce the cooled, hot bleed air 52. The heated ambient air 64 passes through the precooler 50 into the cavity 18 and is exhausted at the rear of the engine 10 through the rear outlet 24. The stream of cooled hot bleed air 52 exits the precooler 50 from a cooled hot air outlet 60, which is connected to the appropriate aircraft systems via a conduit 62. The cooled hot bleed air 52 is thusly directed onward for further use within the aircraft, as discussed.

A scoop 68 is provided at a cold air inlet 56 of the precooler 50 so as to increase the volume and/or pressure of the ambient air 25 captured and fed into the precooler 50. As will be appreciated by those skilled in the art, the scoop 68 may be designed to maximize inlet pressure and minimize the pressure loss of the flow of ambient air 25 therein. A fan air valve 70 for regulating the stream of the cold ambient air 54, and thereby the temperature of the cooled hot bleed air 52, is also provided between the scoop 68 and the cold air inlet 56. The size and location of the fan air valve 70 is also chosen to maximize inlet pressure and minimize the pressure drop. As shown in FIG. 3, the valve 70 is illustrated by way of example as a butterfly valve.

As shown in FIGS. 1-6, the precooler 50 is disposed in the annular cavity 18 directly downstream of the fan 20. The scoop 68 and the cold air inlet 56 of the precooler 50 face forward with respect to a direction of travel. In this way, the scoop 68 and hence the precooler 50 directly receive the cold ambient airflow 54. This is shown particularly in FIG. 4 which illustrates the direct exposure of the precooler scoop 68 just aft of the fan 20.

This forward facing orientation of the precooler 50 and scoop 68 is advantageous in that the precooler 50 is exposed to a maximum inlet airflow pressure. However, this orientation of the precooler 50 exposes the precooler 50 and its various components to the threat of foreign object damage. As mentioned, the ambient air 25 that enters the annular cavity 18 is drawn from outside of the aircraft and is then driven through the cavity 18 by the fan 20. This airflow 25 is untreated and thus may include foreign objects such as hail, debris, etc. The cold ambient airflow 54 which enters the precooler 50 is composed entirely of the ambient air 25 and thus may include these hazards. Due to the forward facing nature of the precooler assembly 50, foreign objects and the like may be delivered by the cold ambient airflow 54 at a high speed directly into the scoop 68 and could make contact with the inners walls of the scoop 68, the inner walls of the cold air inlet 56, the fan air valve 70, or may enter the body of the precooler 50 itself and could strike the heat exchanger 58. As mentioned, such a heat exchanger 58 typically includes fins or ribs through which air passes. These and other elements of the heat exchanger 58 and precooler assembly 50 can be relatively fragile and are thus susceptible to damage due to a foreign object strike.

To protect the illustrated precooler system 50 from foreign object damage, an interference arrangement is provided in or on the precooler 50. The interference arrangement is configured to prevent passage of foreign objects while at the same allow the cold ambient air 54 to enter and pass through the precooler with a minimal drop in airflow pressure so as to allow for effective functioning of the heat exchanger 58.

Figure 8:
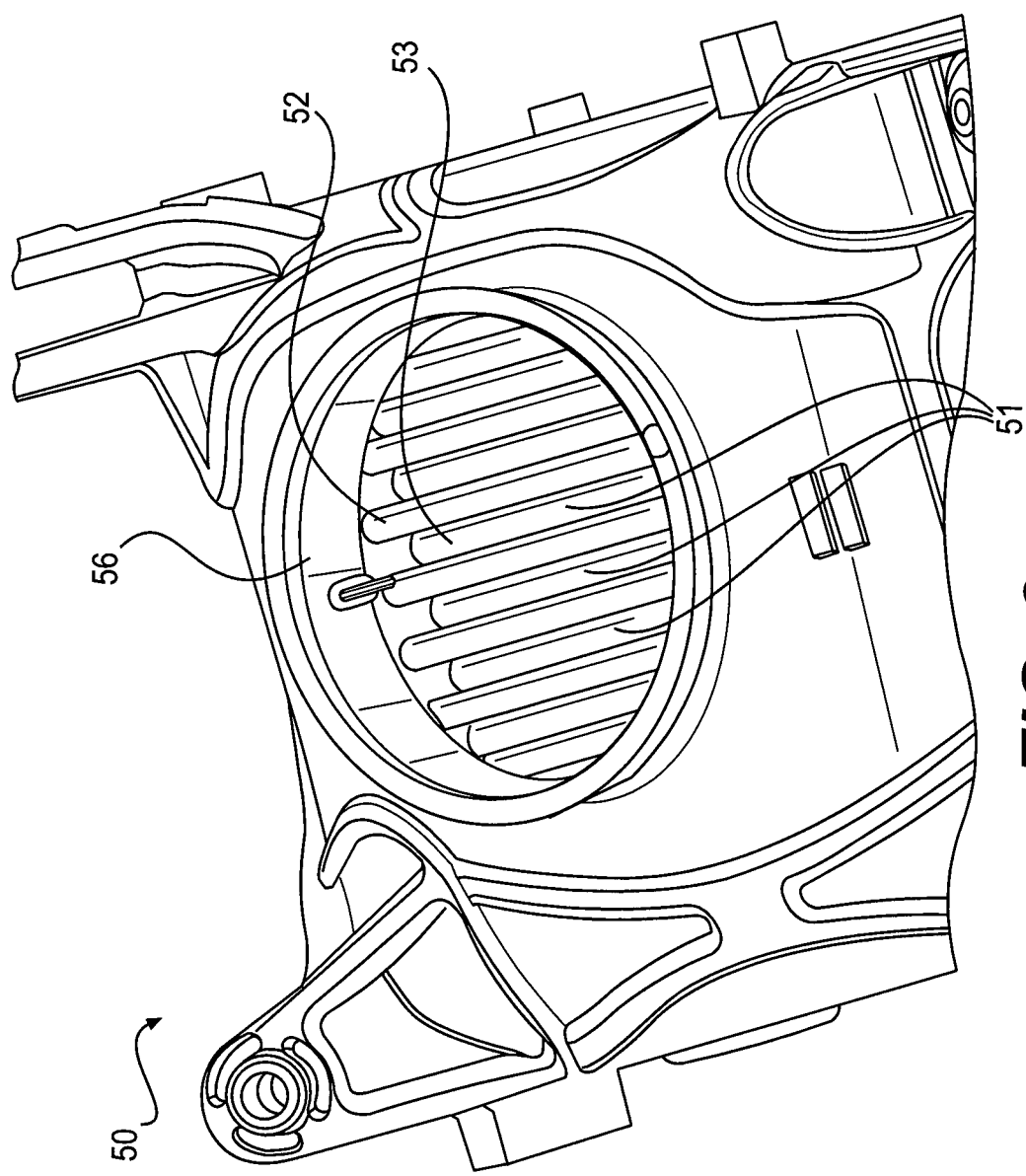
Figure 9:
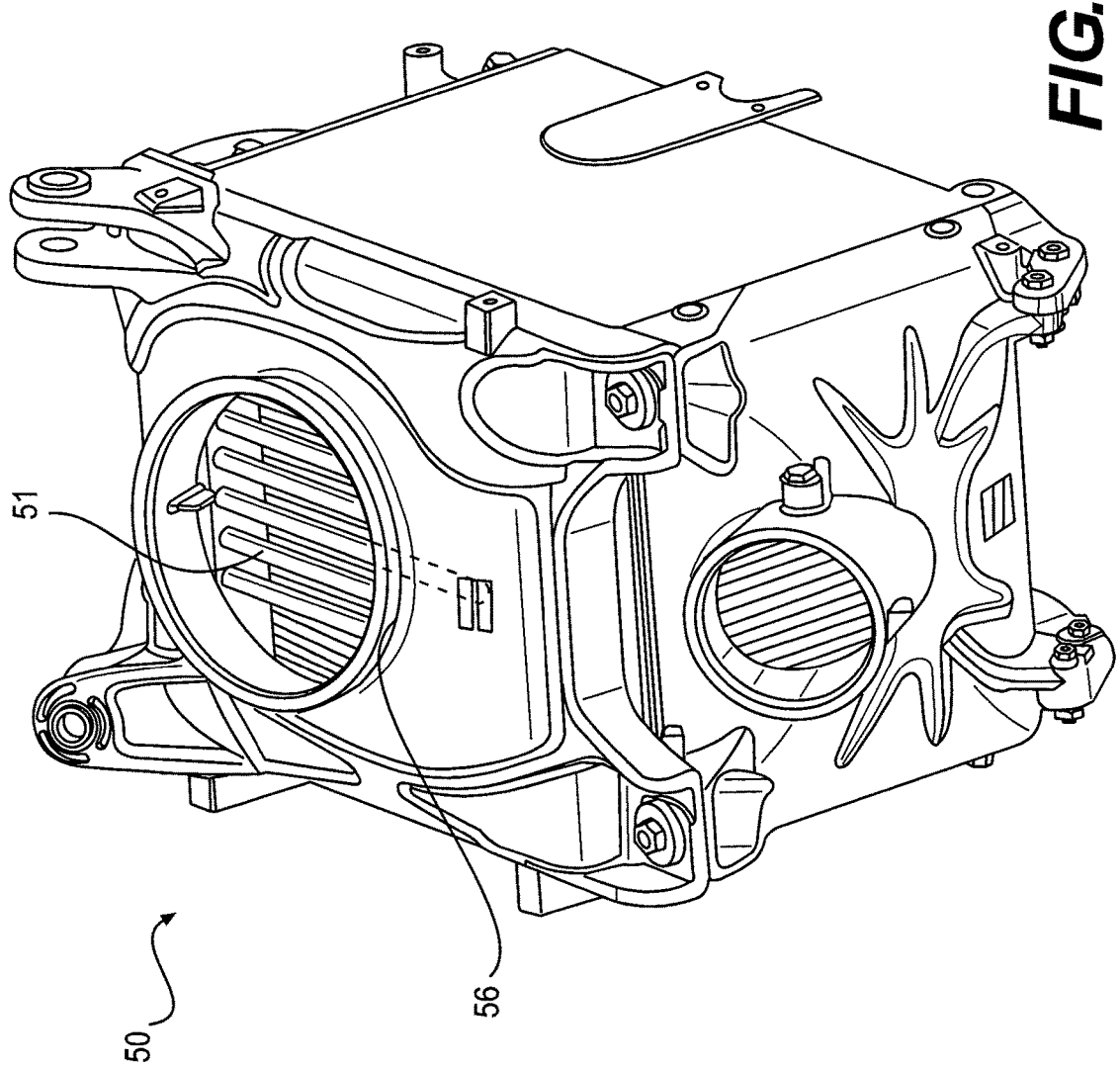
FIGS. 9 and 10 are similar views thereof with an alternate embodiment of the foreign object protection arrangement.
Figure 10:
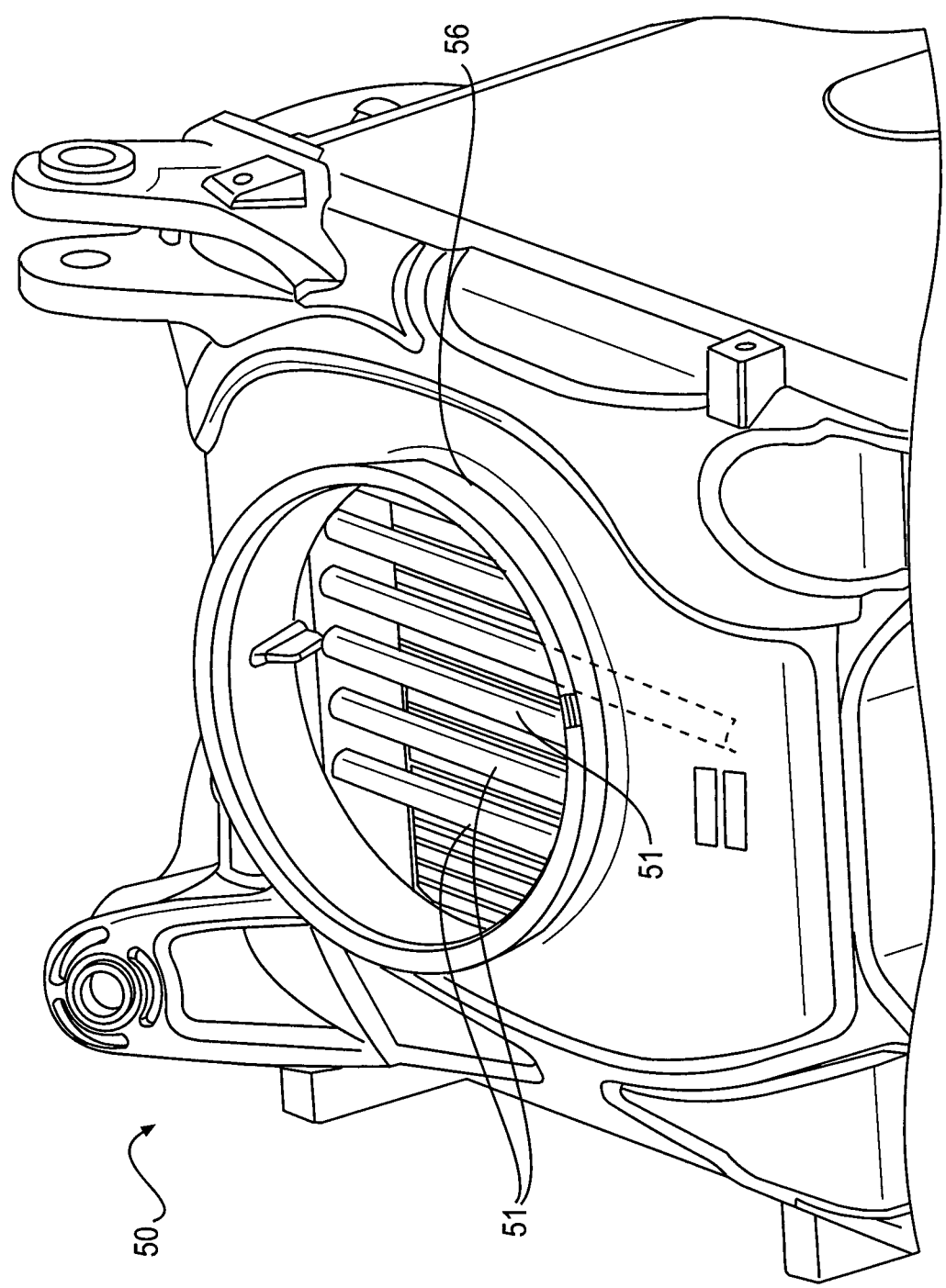

The interference arrangement can take any of a number of forms. A first exemplary embodiment of the interference arrangement is shown schematically in FIGS. 6A-6B. Therein, a plurality of rods or tubes 51 are disposed in the cold air inlet 56 upstream of the precooler 50 and its heat exchanger 58. The rods 51 are disposed vertically (i.e., parallel to the Y-axis) with respect to the engine 10 and are arranged generally perpendicular to the direction of the airflow 54 which travels generally in the Z-direction. (See reference axes in FIGS. 1, 6A, and 6B.) The rods 51 extend substantially parallel to one another and, as shown, are arranged in two linear rows which extend along the X-axis. A first row 52 of the rods 51 is disposed upstream relative to a second row 53 of the rods 51. The rods 51 of the first row 52 are staggered with respect to the rods 51 of the second row 53. That is, the rods 51 of the first and second rows 52, 53 are dis-aligned with respect to the direction of the airflow 54. As such, when viewed from the scoop 68 along the Z-axis, each rod from the second row is disposed downstream from and in between two rods 51 of the first row 52. The exception to this, of course, are the two rods 51 at either end of the second row. This staggered arrangement can be seen in FIG. 6A and also in FIGS. 7 and 8 which provide a perspective view of the precooler 50 with the scoop 68 removed. FIGS. 9 and 10 show an alternate version of the interference arrangement where only a single row of the rods 51 is disposed in the cold air inlet 56 of the precooler 50. Further alternate versions include the two rows 52, 53 of the rods discussed above and additional rows of rods 51. For example, such arrangement could include a third row of rods 51, a fourth row of rods 51, and so on. These additional rows may be staggered and/or aligned with the rods 51 of the upstream rows.

The rods 51 are shown by way of example in the Figures as being generally cylindrical and as including a circular cross-section which is consistent across their length. More generally, the rods 51 may include a curvilinear cross-section or a rectilinear cross-section or a cross-section having a combination of curvilinear and rectilinear features. Additionally, the cross-section of the rods 51 may vary from rod to rod and even may vary within a single rod 51 across its length.

As shown in the drawings, the rods 51 can be of equivalent size in terms of thickness and length, or they may vary in size between the first and second rows, or within a single row. The spacing between the rods 51 may be uniform and consistent across a respective row. Alternatively, this spacing may vary. For example, the spacing between rods 51 in areas of likely foreign object impact may be reduced relative to spacing rods 51 in low impact zones.

In an alternate embodiment of the invention, the rods 51 of one or more of the rows 52 and 53 are arranged horizontally with respect to the engine 10, i.e. the rods 51 are arranged along the X-axis. In a further embodiment, the rods 51 of one or more of the first and second rows 52, 53 are arranged at an angle between the X and Y axes such that the rods extend angularly with respect to the engine 10, not horizontally or vertically. In another embodiment, some or all of the rods 51 of one or more of the rows 52 and 53 may extend in a curvilinear path across the cold air inlet 56 rather than in a linear fashion.

As illustrated, the rods 51 are disposed in the cold air inlet 56 of the precooler assembly 50. In general, the rods 51 may be disposed at any location that is sufficient for occluding the passage of foreign objects within the precooler assembly 50 while still permitting sufficient cold airflow 54 through the heat exchanger 58 to efficiently and effectively cool that hot bleed air 42. For example, the rods 51 may be disposed on or in close proximity to the heat exchanger 58, i.e., downstream of the cold air inlet 56. Alternatively, the rods 51 may be installed within the scoop 68 or at the forward opening of the scoop 68.

In one embodiment of the invention, the rods 51 are heated by any known conventional means. The heating of the rods 51 prevents accumulation of ice on the rods 51. As such, if hail or other frozen debris is intercepted by the rods 51, it will melt due to the heated rods and then eventually pass through the precooler as moisture or vapor.

As mentioned, the interference arrangement of the invention can assume any form that is configured to prevent or at least inhibit the passage of foreign objects while at the same allow the cold ambient air 54 to enter and pass through the precooler with a minimal drop in airflow pressure so as to allow for effective functioning of the heat exchanger 58.

FIGS. 11-13 show another alternate embodiment of the interference arrangement. Here, the interference arrangement comprises a thick screen 200 including first screen elements 202 and second screen elements 204. In the illustrative embodiment, the first and second elements 202, 204 are disposed perpendicular to one another and each element 202, 204 includes ends 206 fixed to a frame 208. The screen 200 is disposed in the cold air inlet 56 of the precooler assembly 50, as particularly shown in the schematic illustration of FIG. 15. The screen 200 extends across the area of the inlet 56 and is disposed substantially perpendicular to the direction of the cold airflow 54. The various first elements 202 are arranged parallel to one another and orthogonally with respect to the second elements 204. Similarly, the various second elements 204 are arranged parallel to one another, but yet are orthogonal to the first elements 202. The first and second elements 202, 204 are essentially rods or bars which intersect where they cross each other or are fixedly woven at these locations so as to essentially bypass one another. The first and second elements 202, 204 essentially form a grid which in the current embodiment delimits a plurality of square-shaped spaces 210.

As shown in FIG. 13, the screen 200 is disposed within the cold air inlet 56 just upstream from the precooler 50 and the heat exchanger 58. The screen 200 extends across an interior area of the cold air inlet 56 so as to be disposed substantially perpendicular to a direction of the cold airflow 54.

The screen 200 prevents foreign objects from directly striking the fins 59 of the heat exchanger 58. That is, the first and second screen elements 202, 204 are shaped, sized, and disposed to intercept hail, debris, and other foreign objects which may be contained within the cold air 54. Furthermore, the spaces 210 delimited by the elements 202, 204 are sized to minimize the pressure drop of the cold airflow 54 as it moves through the precooler 50 to thus allow effective operation of the heat exchanger 58.

As with the rods 51, the descriptions of the screen arrangement 200 are merely exemplary. The shape, size, orientation, and disposition of the first screen elements 202 and the second screen elements 204, may vary and be altered within the broad scope of this disclosure. For example: the elements 202 and 204 may extend angularly, horizontally, or vertically with respect to the engine; the cross-section of the elements 202, 204 may be curvilinear, rectilinear, or both; the cross-section of the elements 202, 204 may be consistent across their respective length and consistent in like elements or the cross-section may vary in one or both respects; etc. The elements 202, 204 may be disposed uniformly across the respective arrangement 200 or non-uniformly. Additionally, the screen arrangement 200 may be disposed at any suitable position within the precooler assembly 50. That is, the arrangement 200 may be disposed at any location that is sufficient for occluding the passage of foreign objects within the precooler assembly 50 while still permitting sufficient cold airflow 54 through the heat exchanger 58 to efficiently and effectively cool that hot bleed air 42. For example, the arrangement 200 may be disposed on or in close proximity to the heat exchanger 58, i.e., downstream of the cold air inlet. Alternatively, the arrangement 200 may be installed within the cold air inlet 56, within the scoop 68, or at the forward opening of the scoop 68.

Again similar to the rods 51, the screen arrangement 200 may be heated by any known conventional means in order to prevent accumulation of ice on the various elements 202, 204.

While the above discussed embodiments of the foreign object interference arrangement have been described with respect to a precooler unit of a GTF engine, the application of the invention is of course not limited to this configuration. The discussed interference arrangements, and/or additional alternate embodiments thereof, may be utilized in a precooler unit of a non-GTF engine or in any other suitable engine assembly or aircraft component that requires protection from contact by a foreign object in a received airflow stream.

As used herein the terms "comprising" (also "comprises," etc.), "having," and "including" is inclusive (open-ended) and does not exclude additional, unrecited elements or method steps. The singular forms "a," "an," and "the" include plural referents unless the context clearly dictates otherwise. The term "or" means "and/or." Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An engine assembly for an aircraft, comprising:
a turbine engine including a compressor and a turbine;
a reduction gear mechanism;
a fan driven by the turbine through the reduction gear mechanism to deliver ambient air to the turbine engine and to a section that bypasses the turbine engine to generate thrust;
a precooler heat exchanger configured to receive bleed air from the compressor and cool the bleed air for distribution to at least one system of the aircraft, the precooler including a cooling air inlet downstream from the fan and facing a direction of travel of the aircraft;
an interference arrangement disposed in the cooling air inlet upstream from the precooler heat exchanger, the interference arrangement comprising a plurality of substantially linear rods which extend across the cooling air inlet in a direction generally perpendicular to airflow;
wherein the interference arrangement is configured to physically obstruct passage of a foreign object within the cooling air inlet.

2. The engine assembly of claim 1, wherein the plurality of substantially linear rods are disposed in a staggered manner with regard to one another in the direction of the airflow.

3. The engine assembly of claim 1, wherein the plurality of substantially linear rods comprise a first row of rods positioned generally in a first plane extending across the cooling air inlet and a second row of rods positioned in a second plane extending across the cooling air inlet, where the first plane is upstream relative to the second plane and the rods of the first row are staggered with respect to the rods of the second row.

4. The engine assembly of claim 3, wherein the substantially linear rods are staggered such that the foreign object traveling in the cooling air inlet in a direction parallel to the airflow will strike the first row or a rod from the rods of the second row.

5. The engine assembly of claim 1, wherein the substantially linear rods have a generally circular cross-section.

6. The engine assembly of claim 1, wherein the interference arrangement comprises a heat element configured to prevent ice accumulation on the interference arrangement.

7. The engine assembly of claim 1, wherein the interference arrangement is further configured to minimize a pressure drop in the airflow across the interference arrangement.

8. The engine assembly of claim 1, wherein the cooling air inlet comprising an air inlet scoop, the scoop facing the direction of travel of the aircraft so as to directly receive the ambient air entering the engine assembly from outside of the aircraft.

9. The engine assembly of claim 1, further comprising:
a nacelle;
wherein the turbine engine, the reduction gear mechanism, the precooler heat exchanger and the interference arrangement are within an annular cavity of the nacelle and supported by a pylon;
the precooler is configured to receive the ambient air entering the nacelle from an exterior of the aircraft.

10. The aircraft comprising the engine assembly device of claim 1.

* * * * *